US009822759B2

(12) United States Patent
Pipo Benito (10) Patent No.: US 9,822,759 B2
(45) Date of Patent: Nov. 21, 2017

(54) FIXATION FOR A WIND TURBINE BLADE TO THE HUB

(71) Applicant: INGENIERIA PROSIX, S. L., Donostia (Gulpúzcoa) (ES)

(72) Inventor: Álvaro Pipo Benito, Donostia (ES)

(73) Assignee: INGENIERIA PROSIX, S. L., Donostia (Guipúzcoa) (ES)

( * ) Notice: Subject to any disclaimer, the term of this patent is extended or adjusted under 35 U.S.C. 154(b) by 244 days.

(21) Appl. No.: 14/759,841

(22) PCT Filed: Jan. 8, 2014

(86) PCT No.: PCT/ES2014/070008
§ 371 (c)(1),
(2) Date: Jul. 8, 2015

(87) PCT Pub. No.: WO2014/108591
PCT Pub. Date: Jul. 17, 2014

(65) Prior Publication Data
US 2015/0361950 A1    Dec. 17, 2015

(30) Foreign Application Priority Data

Jan. 10, 2013    (ES) .................................. 201330017

(51) Int. Cl.
F03D 1/06    (2006.01)
F03D 1/00    (2006.01)
F03D 13/10   (2016.01)

(52) U.S. Cl.
CPC .......... *F03D 1/001* (2013.01); *F03D 1/0658* (2013.01); *F03D 1/0675* (2013.01);
(Continued)

(58) Field of Classification Search
CPC ...... F03D 13/10; F03D 1/0675; F03D 1/0691; F03D 1/0658; F05B 2260/301; F05B 2280/6003; Y02E 10/721
See application file for complete search history.

(56) References Cited

U.S. PATENT DOCUMENTS 4,728,263 A   3/1988 Basso
4,915,590 A   4/1990 Eckland et al.
(Continued)

FOREIGN PATENT DOCUMENTS

DE   102011051172   12/2012
EP        2138716   12/2009
(Continued)

OTHER PUBLICATIONS

Machine translation of DE 102011051172, dated Dec. 20, 2012.*
PCT International Search Report and Written Opinion, PCT Appln. No. PCT/ES2014/070008, (dated May 6, 2014), 11 pages.

Primary Examiner — Christopher Verdier
(74) Attorney, Agent, or Firm — Blakely Sokoloff Taylor & Zafman LLP (57) ABSTRACT

The blade root or the internal structure of the blade comprise joining elements for joining to the hub disposed between lamination sheets, consisting of a plurality of inserts, designed to receive a fixing element related to the hub, which facilitate the coupling of the blade to the wind turbine hub. It incorporates fibre bands of compact, elongated and enveloping configuration which grip the inserts configuring assemblies embedded between the lamination sheets, wherein the fibre bands guarantee the progressive progression of stresses between blade and hub.

10 Claims, 9 Drawing Sheets

(52) U.S. Cl.
CPC .......... *F03D 1/0691* (2013.01); *F03D 13/10* (2016.05); *F05B 2260/301* (2013.01); *F05B 2280/6003* (2013.01); *Y02E 10/721* (2013.01)

(56) References Cited

U.S. PATENT DOCUMENTS

| | | | | |
|---|---|---|---|---|
| 4,966,527 | A * | 10/1990 | Merz | ............ B29C 70/202 |
| | | | | 416/230 |
| 6,371,730 | B1 * | 4/2002 | Wobben | ............ F03D 1/0658 |
| | | | | 416/204 R |
| 7,530,168 | B2 | 5/2009 | Sorensen et al. | |
| 2007/0231146 | A1 | 10/2007 | Birkemeyer et al. | |
| 2009/0010764 | A1 * | 1/2009 | Parisy | ............ B64C 27/48 |
| | | | | 416/226 |
| 2009/0155086 | A1 * | 6/2009 | Parisy | ............ B64C 27/48 |
| | | | | 416/226 |
| 2009/0263250 | A1 | 10/2009 | Quell et al. | |
| 2012/0207607 | A1 | 8/2012 | Mironov | |
| 2013/0177428 | A1 * | 7/2013 | Zeller | ............ F03D 1/0658 |
| | | | | 416/219 A |
| 2016/0053741 | A1 * | 2/2016 | Sabbadin | ............ F03D 1/0658 |
| | | | | 416/230 |

FOREIGN PATENT DOCUMENTS

| | | | | |
|---|---|---|---|---|
| EP | | 2677170 A1 * | 12/2013 | ............ F03D 1/0658 |
| ES | | 8302209 | 4/1983 | |
| ES | | 2382439 | 6/2012 | |
| WO | WO-2011035548 | | 3/2011 | |
| WO | WO-2012111518 | | 8/2012 | |
| WO | WO-2012140039 | | 10/2012 | |
| WO | WO-2012140062 | | 10/2012 | |

\* cited by examiner

FIXATION FOR A WIND TURBINE BLADE TO THE HUB

CROSS-REFERENCE TO RELATED APPLICATIONS

The present patent application is a national phase application of International Application No. PCT/ES2014/070008, filed Jan. 8, 2014, which claims priority to Spanish Application No. P201330017, filed Jan. 10, 2013, the disclosures of which are incorporated herein by reference.

OBJECT OF THE INVENTION

The present invention can be included in the technical field of wind turbine blades, more specifically relating to the joining means for joining the blade to the turbine hub.

A wind turbine is described which integrates inserts provided with bores designed to receive the fixing elements which connect the blade to the turbine hub, wherein the additional incorporation is provided of fibre bands which grip in an enveloping manner the inserts and are disposed intercalated in the blade laminate establishing a secure and resistance fixing of said inserts, also facilitating a gradual transmission of stresses between blade and hub.

BACKGROUND OF THE INVENTION

In recent years, the renewable energy generation market has called for the development of increasingly large wind turbines to meet increasing demands. This development means the appearance of technical problems, derived from the enormous structures built, in particular in the wind blades, largely built in fibre-reinforced plastic which require being joined to the wind turbine hub.

However, fibre-reinforced plastics do not work well in high-stress concentration conditions, such as those which appear in the joining of the blade root to the hub since, for certain blade sizes, problems of fatigue usually appear, mainly due to the large quantity of blade load cycles.

Wind turbine blades are generally laminated composite material, which is formed by several layers of reinforced material joined by a resin and cured to consolidate the blade. To guarantee the fixing of each one of the blades to the hub, the solution is generally adopted of incorporating internally threaded metal inserts, which are introduced during blade manufacture, in combination with fixing screws of the hub which thread in these inserts of the blade establishing a connection of the hub to the blade.

Document U.S. Pat. No. 4,915,590 is an example of this type of joint, since it shows several inserts internally embedded in the blade root, in parallel disposal to the blade shaft, wherein each insert incorporates a longitudinal threaded bore designed to receive a screw of the hub, so that the screws thus introduced in the inserts establish the fixing between the blade and the hub.

Document U.S. Pat. No. 7,530,168 relates to a manufacturing method of a wind turbine blade and the blade thus obtained, detailing that the blade root comprises a plurality of inserts or bushings provided with an internal threaded sector designed to receive the screws that connect the blade to the hub. In this case it has been provided that the inserts have two sections, or that they are formed by two joined portions, wherein one of them is of cylindrical tubular configuration and integrates the threaded sector and the other is of chamfered tubular configuration with progressively decreasing section until its distal end.

This document discloses the process of forming the blade root comprising the phases of: providing a holder having spaced recesses designed to house the inserts, placing a first layer of fibre on the holder, locating the inserts in said recesses, and then providing additional fibre layers on the inserts, ending with the fibre consolidation stage.

Document ES 2382439 shows the type of inserts described above, wherein they appear separated on a circular arc of the blade, and also spacing elements situated between the inserts are observed, with the spacers being connected with the inserts by one external laminate and another internal laminate.

Furthermore, other joining solutions between blade and hub are known, such as that shown in US 2009/0263250, wherein it is possible to observe that the blade root has transversal pins disposed in radial or transversal position to the longitudinal shaft of the blade, which have a threaded bore parallel to the longitudinal shaft of the blade wherein a bolt is threaded, which also traverses a sector of the hub, establishing the tightening between the hub and the blade by a nut coupled in the bolt. The use of these transversal pins constitutes an alternative solution to longitudinal inserts and is especially suitable for the case of blades with little thickness.

Document US 20070231146 has also provided the use of transversal pins, wherein the adjacent transversal pins are situated at a different distance from the root edge, thus contributing to a better distribution of stresses.

On the other hand, different geometries are known of the inserts, such as that shown in document US2012/0207607, which has a proximal end wherein a threaded bore is defined and an elongated end of practically flat wedged configuration which facilitates the lamination operation of the blade root.

The aforementioned joining solutions between hub and blade, however, can be optimized, since in this type of joints isolated stresses are generated during the blade operation which lead to problems of fatigue which affect the blade life.

DESCRIPTION OF THE INVENTION

The present invention relates to a wind turbine which incorporates laminated construction elements consisting of an aerodynamic portion, an internal structure or stiffening core of the blade and a root, and joining means for joining the blade to the wind turbine hub, comprising a plurality of inserts provided with internal bores for the mounting of fixing elements which establish the releasable coupling of the blade to the wind turbine hub. Unlike the solutions described in the previous section, the joining means for joining the blade to the hub fundamentally stand out as they additionally comprise fibre bands, preferably unidirectional, which grip the inserts and which are disposed intercalated during lamination of the blade.

The incorporation of these fibre bands gripping the inserts between lamination sheets makes it possible to distribute the load whereto the inserts are subjected in a larger area and reduce local stresses, which leads to an extension of the lifecycle of the blade and the possibility of manufacturing larger blades, as well as facilitating the construction process of blade lamination.

It has generally been provided that the inserts incorporate a gripping sector which constitutes the area of the insert designed to be gripped by the fibre band.

The fibre band has a configuration which is elongated, compact and enveloping and shows an upper section, an intermediate section and a lower section, wherein the lower and upper sections start from a rear side of the band until the opposite or front side wherein the intermediate section is found, with normally curved configuration, which grips the gripping sector of the insert, partially covering it.

The fibres can be distributed from the area of the insert until the rear side, in parallel distribution, in a fan and/or complementarily interlinked.

It has been provided that these fibre bands, in combination with the insert which grips said fibre band, configure assemblies which will be embedded in the blade in the later lamination operation.

The integration of the fibre band with the inserts proposed by this invention facilitates a smooth and gradual transmission of the stresses that appear during normal operation of the blade, between the hub and the blade, more specifically between the fixing elements and the inserts, thus contributing to a greater durability of the blade.

The invention contemplates on the one hand a first solution for joining the blade to the hub wherein the joining means object of this invention are connected to the blade root, specifically of the external covering of the blade root.

On the other hand, the invention contemplates a second solution for joining the blade to the hub wherein the joining means object of this invention are connected to the end of the internal structure of the blade which is found in the area of the blade root.

According to these two joining solutions several embodiments are considered with regard to the configuration and positioning of the blade inserts, as well as of the fixing elements that connect the hub to the blade inserts.

In a first possible embodiment, the inserts are disposed parallel to the longitudinal shaft of the blade and the bore of the body is threaded and blind longitudinally. The gripping sector is formed by a handle defined in the side of the body opposite the opening of the threaded bore, and the fixing elements consist of threaded screws designed to thread in the threaded bore.

In a second possible embodiment, as in the above, the inserts are disposed parallel to the longitudinal shaft of the blade and the bore of the body is longitudinal to the body, threaded and blind. The gripping sector is formed, unlike the previous, by different lateral extensions which perpendicularly extend on both sides of the body of the insert, designed to be gripped by different portions of fibres of the fibre bands, and the fixing elements consist of threaded screws designed to thread in the threaded bore.

In a third possible embodiment, unlike the previous ones, the inserts are defined by different bodies consisting of opposing bushings which are disposed transversally to the longitudinal shaft of the blade, wherein each one of said bodies has a longitudinal bore. The gripping sector is formed by the external cylindrical surfaces of said bodies, designed to be gripped by the fibre bands and the fixing elements consist of threaded screws designed to traverse both bodies.

For either of the two solutions described above for joining the blade to the hub, whether for the case of joining the root covering to the hub or for the case of joining the internal structure of the blade to the hub, it has been provided that when positioning the fibre band with the insert, the fibre band not only grips the insert, but, in the case of joining by the root, the fibre band would additionally grip, between the upper section and the lower section, the end of at least one lamination sheet of the body covering the root, or in the other joining case by the internal structure of the blade, the fibre band would grip, between the upper section and the lower section, the end of at least one lamination sheet of the internal structure of the blade, so that in both cases the upper section of the fibre band would be positioned on the outer face of the sheet and the lower section would be situated on the internal face of said sheet.

In an alternative configuration to that described in the previous paragraph, it has been provided that the fibre band which grips the insert rests on one of the faces of the sheet, so that the upper and lower section of fibres of the band would be on the same side of the sheet, in which case, and in order to separate the upper section from the lower section, the joining means would additionally incorporate an intermediate block, the contact surfaces respectively of the upper and lower sections of the fibre band constituting the upper and lower faces of this block, thus facilitating a suitable positioning of the fibre band around the gripping sector of the insert, as well as guaranteeing the configuration of the fibre band and its positional stability.

This intermediate block is preferably wedge shaped, which is positioned with its highest side in contact or close to the gripping sector of the insert and is extended with decreasing inclination intercalated between the upper and lower section of the fibre band. In this case it contemplates the possibility that the rear side of the upper section and the rear side of the lower section of the band start from the same line.

On the other hand, in order to facilitate the lateral continuity between inserts and fibre bands the incorporation of insertion blocks has been provided which fill the spaces between inserts and also favour the distribution and transmission of transversal loads.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

In light of figures, a series of preferred embodiments of the wind turbine blade object of this invention is described.

Figure 13:
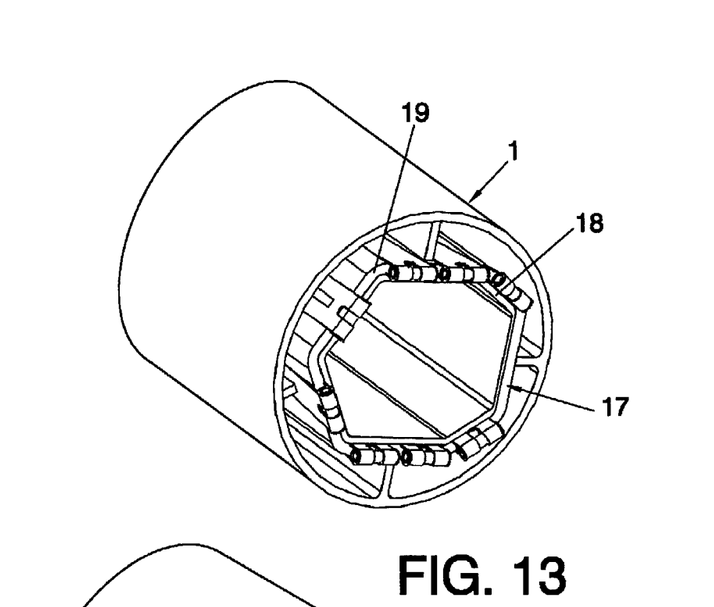
FIG. 13.—Shows a perspective view wherein the root of the blade and the internal structure or core of the blade is observed, wherein the third embodiment of the insert has been incorporated with the fibre band gripping the end of the internal structure of the blade.
Figure 14:
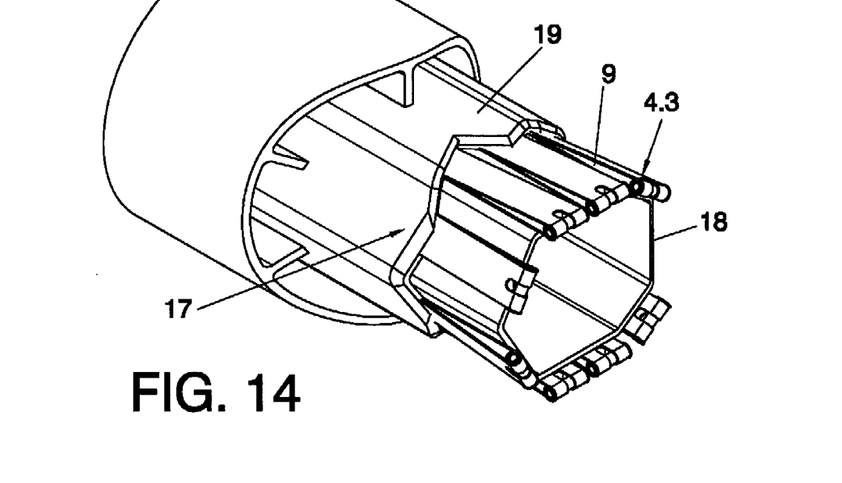
FIG. 14.—Shows a perspective view wherein the root of the blade and the internal structure or core of the blade is observed, wherein the third embodiment of the insert has been represented with the fibre bands between different sheets of the internal structure of the blade.

The blade incorporates an aerodynamic portion, not represented in the figures, a root (1) which can be observed in FIGS. 1 and 6 to 10 adapted for its coupling to the wind turbine hub, which has not been represented either, and an internal structure (17) or stiffening core of the blade which is only shown in FIGS. 13 and 14.

According to the invention, in a first solution it has been provided that the joining means for joining the blade to the hub are associated to the external covering of the root (1), and in a second solution that the joining means are associated to the internal structure (17) of the blade.

The root (1) comprises an external covering which also comprises lamination sheets (2, 3), which are represented in FIGS. 1 and 6 to 10, wherebetween the joining means are found.

Figure 1:
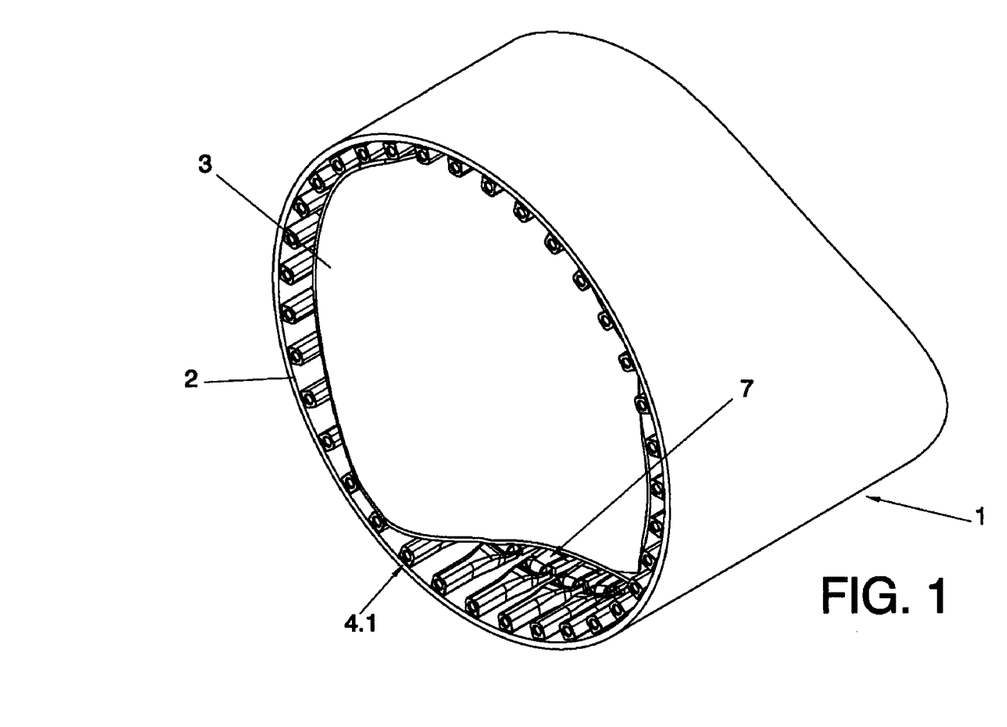
FIG. 1.—Shows a perspective view of a detail of the root of a blade wherein the inserts are situated, configured according to a first embodiment of the insert, with the inserts spaced, in longitudinal disposal and gripped by the fibre bands between a lower sheet and upper laminated sheet.

The joining means proposed in this invention are designed to be embedded between lamination sheets (2, 3, 18, 19) which form part of the blade, as can be observed in FIGS. 1 and 14, for example, and comprise a plurality of inserts (4.1, 4.2, 4.3), wherein each one of said inserts (4.1, 4.2, 4.3) comprise at least one elongated body (5.1, 5.2, 5.3) which is provided with at least one longitudinal bore (6.1, 6.2, 6.3) which is designed to receive a fixing element related to the hub, which facilitate the coupling between the blade and the wind turbine hub.

Figure 2:
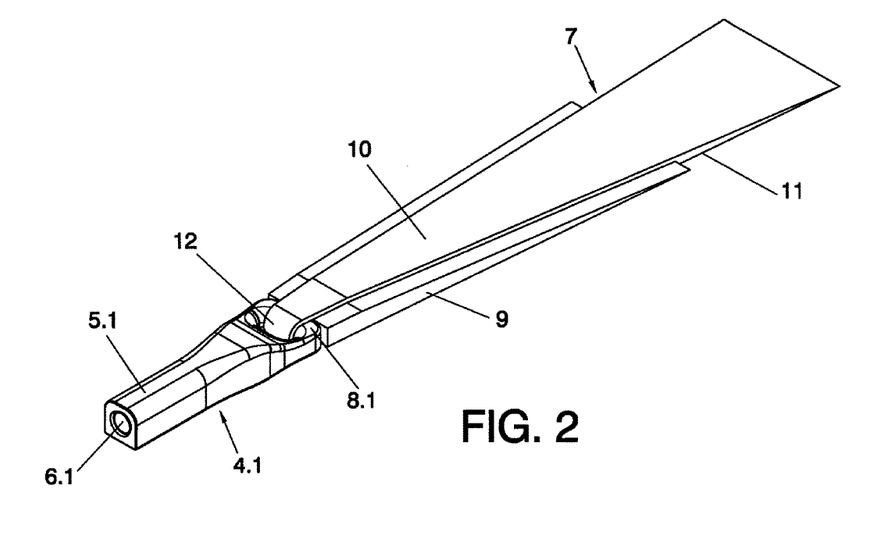
FIG. 2.—Shows a view of the embodiment of the insert of the previous figure gripped by the fibre band.
Figure 3:
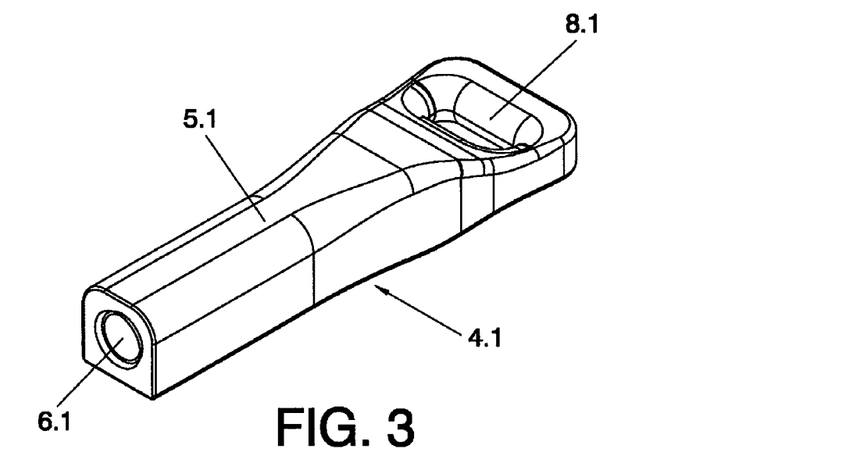
FIG. 3.—Shows a perspective view of only the insert of the previous figures.
Figure 4:
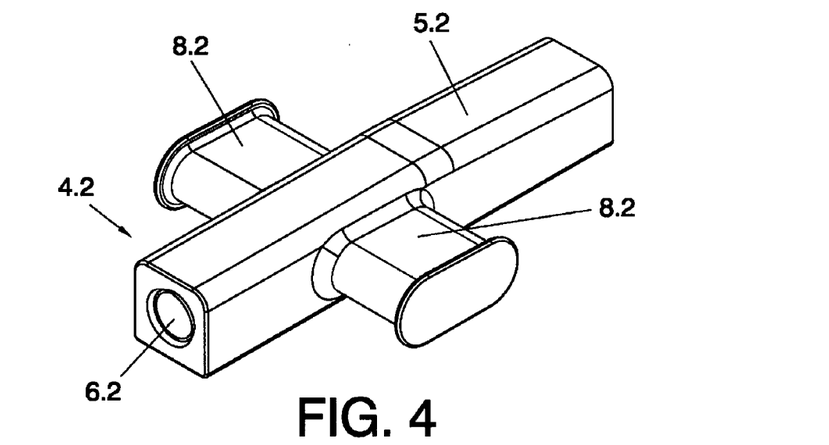
FIG. 4.—Shows a perspective view of a second embodiment of the joining insert.
Figure 5:
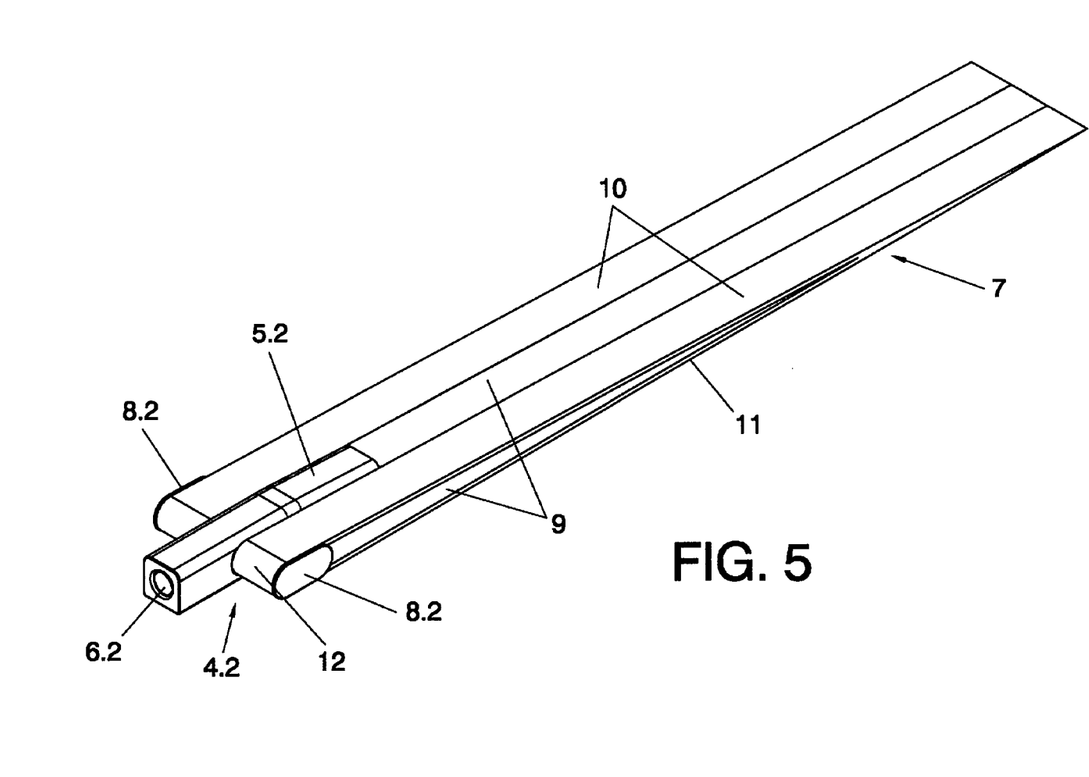
FIG. 5.—Shows a view of the second embodiment representing the insert with the fibre band gripping the lateral gripping sectors.
Figures 11, 12:
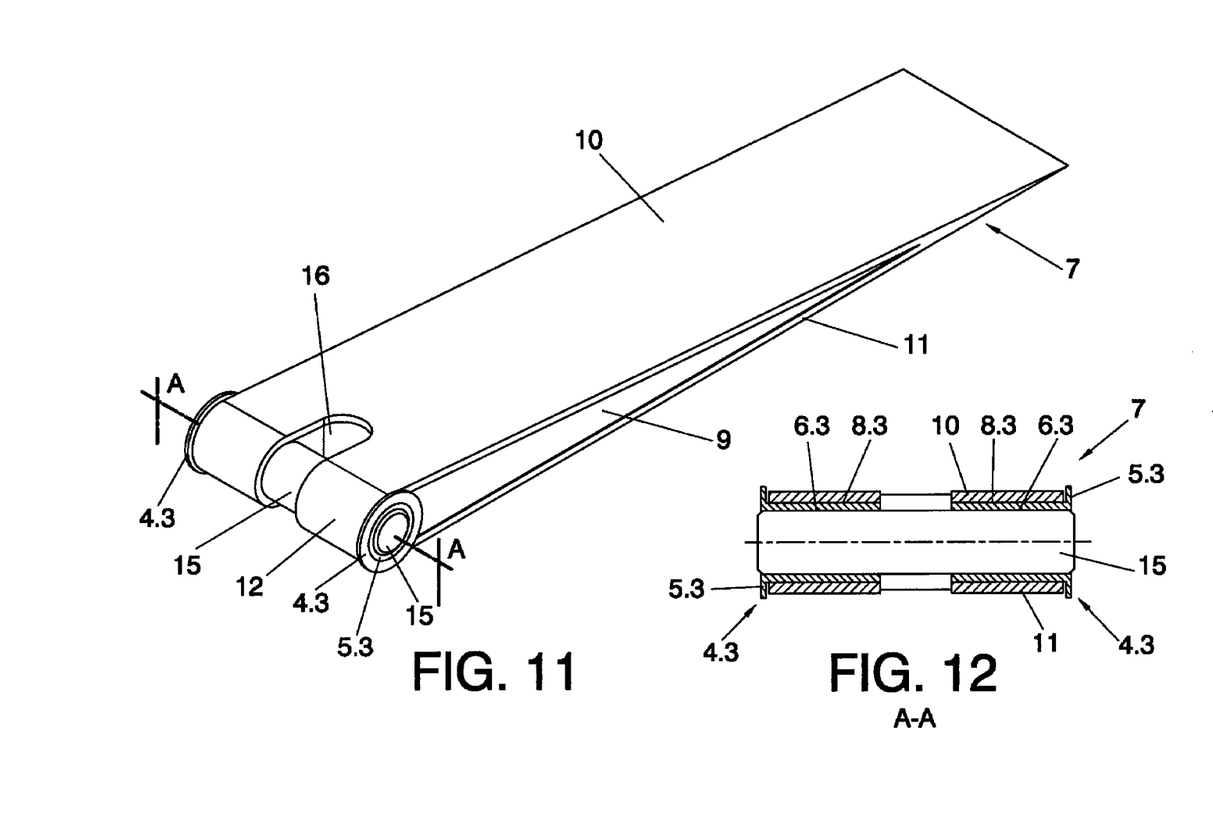
FIG. 11.—Shows a perspective view of the third embodiment, wherein the fibre band gripping the bushings which form the insert is observed, with the pin introduced in said bushings.
FIG. 12.—Shows a detailed view of FIG. 11 according to section A-A.

Unlike other solutions, the joining means also comprise fibre bands (7) of compact, elongated and enveloping configuration, as observed, for example, in FIGS. 2, 5 and 11, which grip the inserts (4.1, 4.2, 4.3) by a gripping sector (8.1, 8.2, 8.3) defined in the inserts (4.1, 4.2, 4.3).

The fibre band (7), as observed in FIGS. 2, 5 and 11 is defined by an upper section (10), a lower section (11) and a joining section (12) which joins both upper (10) and lower (11) sections, normally curved, wherein the lower (11) and upper (10) sections start from a common or rear side of the fibre band (7) until the opposite or front side wherein the joining section (12) is found, which constitutes the section of the fibre band (7) which grips the gripping sector (8.1, 8.2, 8.3) of the insert (4.1, 4.2, 4.3).

FIGS. 2, 5 and 11 show that the joining means additionally comprise at least one intermediate block (9) for each fibre band (7), which is intercalated within the fibre band (7) between the upper section (10) and the lower section (11). Said intermediate block (9) has in this case a wedge shape.

Figure 10:
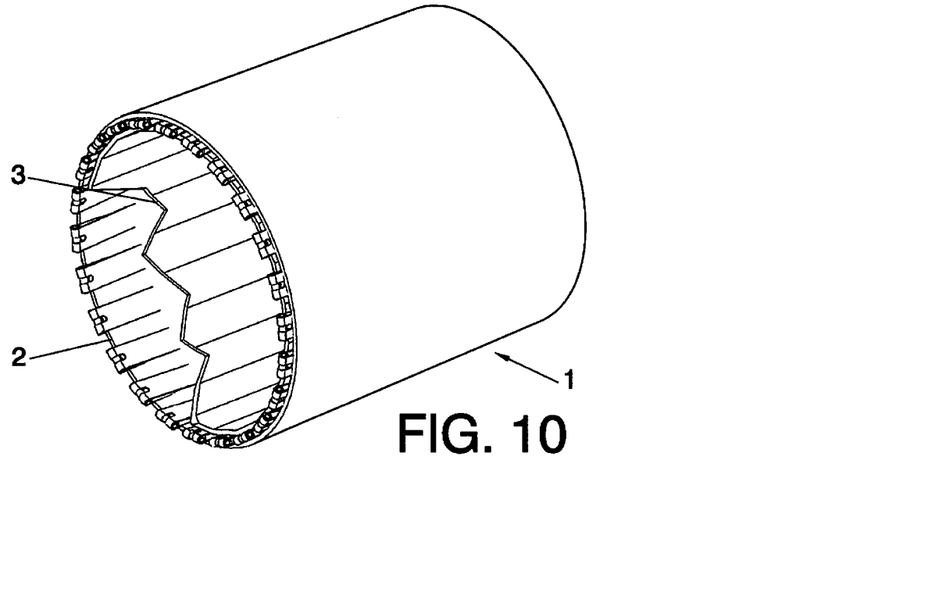
FIG. 10.—Shows a view similar to that of the previous figure wherein the upper laminated sheet has been partially eliminated for a better view of the fibre bands which grip the inserts.

In an alternative embodiment the joining means lack said intermediate block (9) and the fibre bands (7) directly grip, between the upper section (10) and the lower section (11), the ends of at least one of the lamination sheets, as occurs in FIG. 13 for example, wherein the fibre bands (7) grip the lamination sheet (19) between the upper section (10) and the lower section (11), or in the case of FIG. 10 wherein fibre bands grip the lamination sheet (2) between the upper section (10) and the lower section (11).

Figure 6:
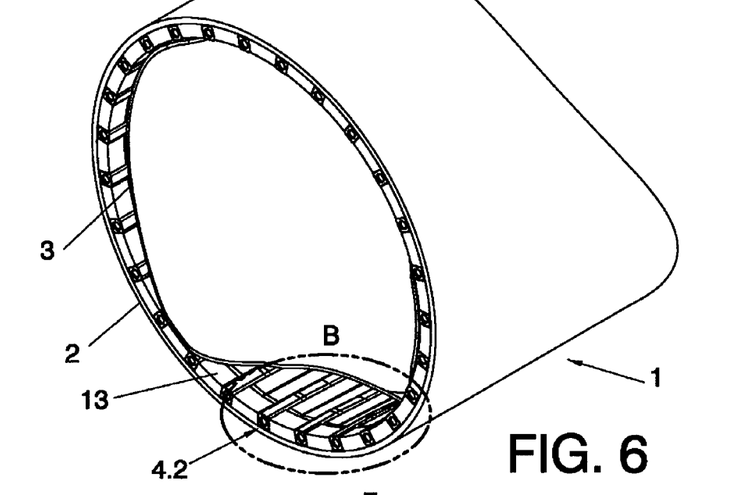
FIG. 6.—Shows a perspective view of a detail of the root of a blade wherein the inserts configured according to the second embodiment are located, wherein insertion blocks situated between inserts have also been represented.
Figure 7:
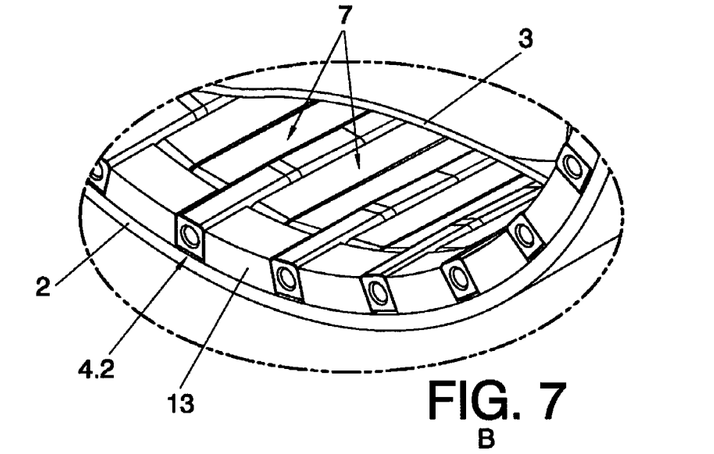
FIG. 7.—Shows an enlarged detail of the previous figure.
Figure 8:
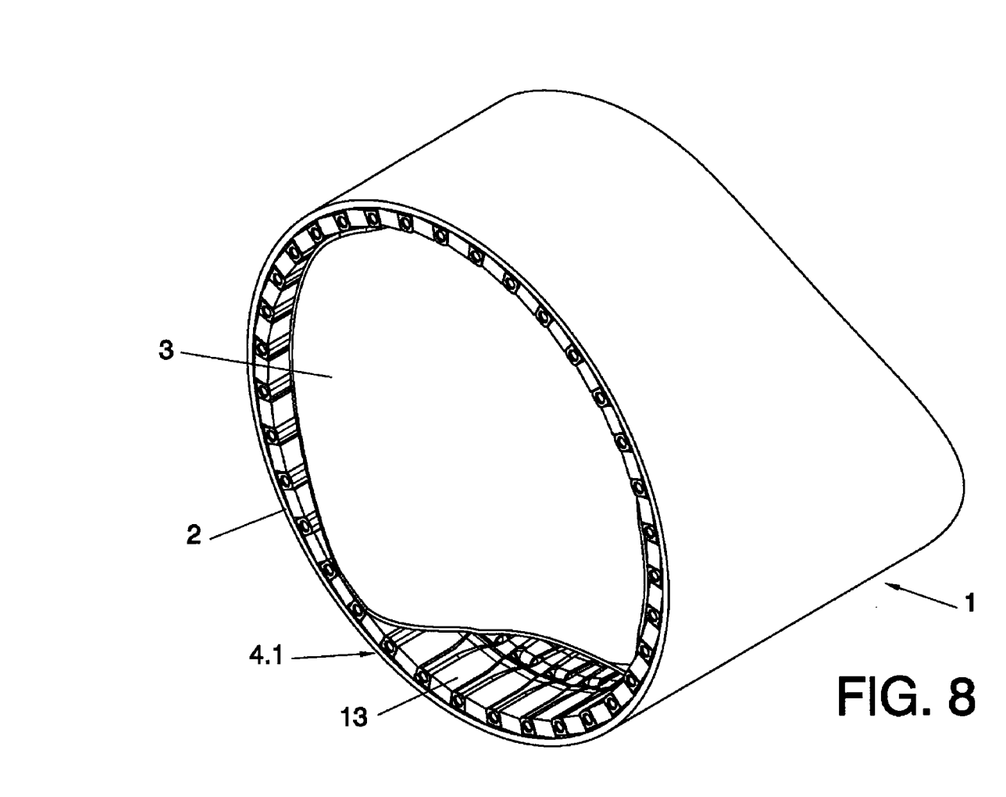
FIG. 8.—Shows a view similar to that of FIG. 1 wherein, unlike the former, the insertion blocks have been incorporated between inserts.

As observed in FIGS. 6, 7 and 8, the blade root (1) can also incorporate insertion blocks (13) situated between the inserts (4.1, 4.2, 4.3) which give continuity to the inserts (4.1, 4.2, 4.3) and to the fibre bands, and facilitate the transmission of transversal loads.

In the figures three alternative solutions have been represented of inserts (4.1, 4.2, 4.3) with their particular configuration adapted to facilitate the coupling of the fixing element which connects the hub to the blade root (1).

In the case of FIGS. 1 to 3 and 8, the first embodiment of insert (4.1) is observed comprising a single elongated body (5.1), wherein the bore (6.1) is a blind threaded bore and the gripping sector (8.1) whereof consists of a handle defined in the side of the body (5.1) opposite the opening of the threaded bore (6.1). In this case the fixing element is a screw, not represented, designed to thread in the threaded bore (6.1). On the other hand, FIG. 2 shows that the fibre band (7) which grips this insert (4.1) extends with progressively increasing width towards its rear side, in the same way as the intermediate block (9).

In the case of FIGS. 4 to 7, the second embodiment of insert (4.2) is observed comprising a single elongated body (5.2), wherein the bore (6.2) is a blind threaded bore and the gripping sector (8.2) consists of different lateral extensions which perpendicularly extend on both sides of the body (5.2). In this case the fixing element is also a screw, not represented, designed to thread in the threaded bore (6.2). For this insert (4.2), in FIG. 5 the possibility has been represented that the fibre band (7) extends around intermediate block (9) divided in two sectors, one for each gripping sector (8.2), sectors which are connected in the rear side of the fibre band (7), distant from the insert (4.2).

Figure 9:
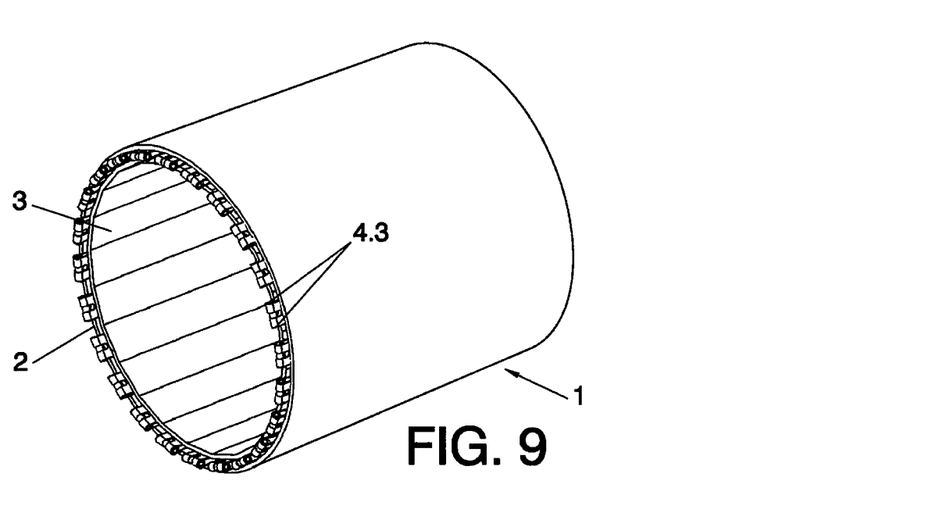
FIG. 9.—Shows a perspective view of a detail of the root of a blade wherein the inserts configured according to a third embodiment are located, where the insert appears in transversal disposal with respect to the longitudinal shaft of the blade.

In the case of FIGS. 9 to 11, the third embodiment of the insert (4.3) is observed comprising different bodies (5.3) consisting of bushings opposing by one of their ends, which are disposed transversally to the longitudinal shaft of the blade root (1), as observed in said figures, wherein each one of said bushings has a bore (6.3) opposite that of the other bushing, as observed in FIG. 12, and the gripping sector (8.3) is formed by the cylindrical outer surface of said bodies (5.3). In this case the fixing element consists of a pin (15).

As observed in FIG. 11, a central opening (16) is defined in the fibre band (7) and in the intermediate block (9) located between the bodies (5.3) which is designed for example to incorporate a lug of the hub, not represented, which would be connected to the insert (8.3), after penetrating between the bodies (5.3) in said central opening (16) and after the later insertion of the pin (15) which would traverse the bodies (5.3) and the opening of the lug.

FIGS. 13 and 14 represent the end of the internal structure (17) of the blade which is observed in correspondence with the blade root, the internal structure (17), instead of the covering of the root (1), being responsible for establishing the connection of the blade to the hub.

Likewise, said figures show the fibre bands (7) which grip the inserts (4.3) and which are disposed, in the case of FIG. 13, gripping the lamination sheet (19) which forms part of the internal structure (17), or in the case of FIG. 14 they are situated between lamination sheets (18,19) gripping an intermediate block (9).

Although FIGS. 13 and 14 have only represented the joining system with the insert (4.3), any of the previously shown solutions with the inserts (4.1, 4.2) can be equally valid for the internal structure (17).

The invention claimed is:

1. A wind turbine blade comprising:
a blade root formed by lamination sheets,
joining elements comprising:
    a plurality of inserts wherein each one of said inserts comprises:
        at least one elongated body provided with at least one longitudinal bore provided with one opening,
        a gripping sector,
    fibre bands of compact, elongated and enveloping configuration which grip the inserts, said fibre bands comprising:
        an upper section,
        a lower section,
        a joining section located between the lower and upper section which grips the gripping sector of the insert,
    wherein the fibre bands additionally grip, between the upper section and the lower section, at least one of said lamination sheets.

2. The wind turbine blade of claim 1, further comprising insertion blocks situated between the inserts which give continuity to the inserts and to the fibre bands.

3. The wind turbine blade of claim 1 wherein the inserts are each all first inserts disposed parallel with respect to the blade root, wherein the elongated body is single, the bore is a blind threaded bore, and the gripping sector is formed by a handle defined in a side of the elongated body opposite the opening of the threaded bore.

4. The wind turbine blade of claim 1 wherein the inserts are each all second inserts disposed parallel with respect to the blade root, wherein the elongated body is single, the bore is a blind threaded bore, the gripping sector is formed by lateral extensions which perpendicularly extend on both sides of the elongated body.

5. The wind turbine blade of claim 1 wherein the inserts are each all third inserts disposed transversally to the blade root comprising elongated bodies formed by separate bushings opposed at their ends, wherein the bores are through-bores and the gripping sector is formed by a cylindrical outer surface of said bodies.

6. A wind turbine blade comprising:
a blade root
an internal structure, formed by lamination sheets
joining elements comprising:
    a plurality of inserts wherein each one of said inserts comprising:
        at least one elongated body provided with at least one longitudinal bore provided with one opening, and
        a gripping sector,
    fibre bands of compact, elongated and enveloping configuration which grip the inserts, said fibre bands comprising:
        an upper section,
        a lower section,
        a joining section located between the lower and upper section which grips the gripping sector of the insert,
    wherein the fibre bands additionally grip, between the upper section and the lower section, at least one of said lamination sheets.

7. The wind turbine blade of claim 6, further comprising insertion blocks situated between the inserts which give continuity to the inserts and to the fibre bands.

8. The wind turbine blade of claim 6 wherein the inserts are each all first inserts disposed parallel with respect to the internal structure, wherein the elongated body is single, the bore is a blind threaded bore and the gripping sector is formed by a handle defined in a side of the elongated body opposite the opening of the threaded bore.

9. The wind turbine blade of claim 6 wherein the inserts are each all second inserts disposed parallel with respect to the internal structure, wherein the elongated body is single, the bore is a blind threaded bore, and the gripping sector is formed by lateral extensions which perpendicularly extend on both sides of the elongated body.

10. The wind turbine blade of claim 6 wherein the inserts are each all third inserts disposed transversally to the internal structure comprising elongated bodies formed by separate bushings opposed at their ends, wherein the bores are through-bores and the gripping sector is formed by a cylindrical outer surface of said bodies.

* * * * *